UNITED STATES PATENT OFFICE.

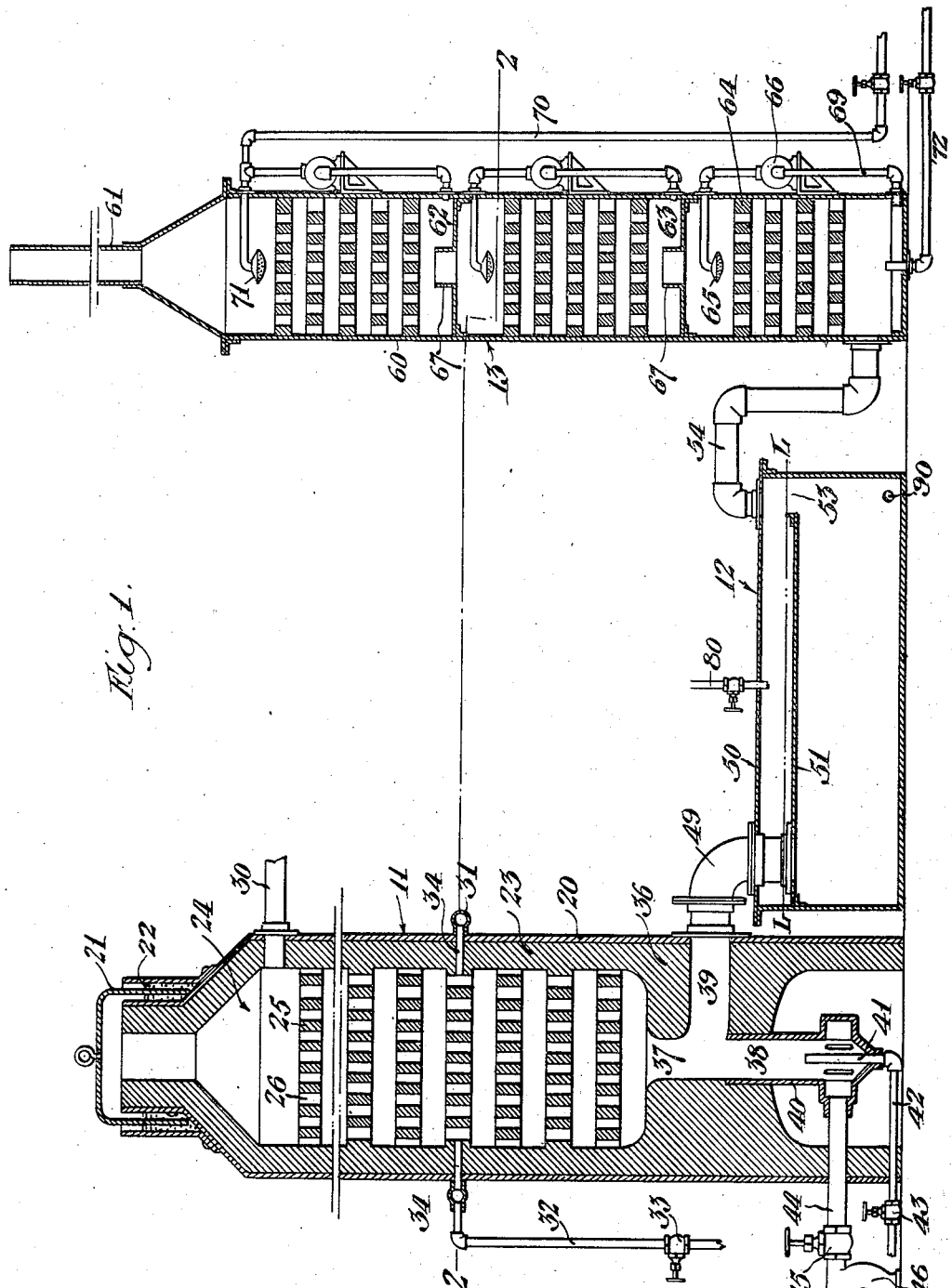

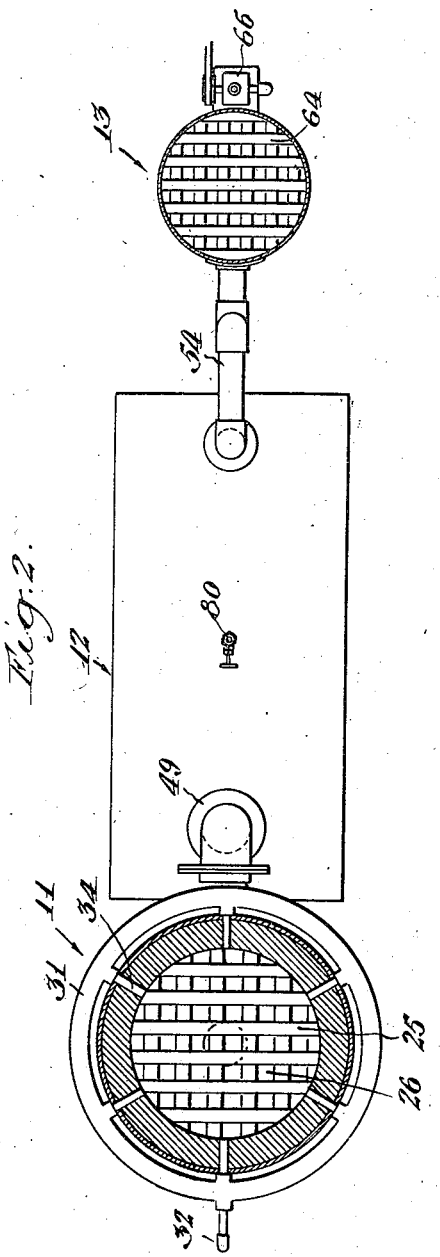

ROBERT WADE POINDEXTER, OF LOS ANGELES, CALIFORNIA, ASSIGNOR TO POINDEXTER AND COMPANY, A COPARTNERSHIP.

PROCESS OF PRODUCING HYDROCYANIC ACID.

1,387,170. Specification of Letters Patent. Patented Aug. 9, 1921.

Application filed July 6, 1920. Serial No. 394,343.

*To all whom it may concern:*

Be it known that I, ROBERT WADE POINDEXTER, a citizen of the United States, residing at Los Angeles, county of Los Angeles, and State of California, have invented a new and useful Process of Producing Hydrocyanic Acid, of which the following is a specification.

My invention relates to the art of producing hydrocyanic acid and an object of my invention is to provide a process by which hydrocyanic acid may be produced from relatively inexpensive materials with a greater degree of efficiency and at a lower cost than has heretofore been considered possible.

In my process I utilize a hydrocarbon, preferably a natural gas, and ammonia, mixing these gases under conditions which promote a rapid reaction therebetween. I have found, that while it is possible to produce hydrocyanic acid by the mere association of ammonia and a hydrocarbon and the application of heat, that it is only where the actual association of the gases during the reaction period is controlled to make this reaction very rapid that high efficiencies are obtained. This I prefer to do by heating the hydrocarbon previous to the introduction of ammonia therein, thereafter subjecting the mixture to sufficient heat over a period just sufficient for the reaction to take place, the gases then being withdrawn from the heated zone so that the hydrocyanic acid is not broken up.

Further objects and advantages will be made evident hereinafter.

My invention comprises the novel arrangement and combination of parts shown on the accompanying drawing and set forth in the following specification.

In these drawings, Figure 1 is a diagrammatic elevation partly in section of one embodiment of my invention.

Fig. 2 is a plan view on a plane represented by the line 2—2 of Fig. 1.

In the embodiment of my invention, I show a producer 11, a cooler 12 and an absorbing tower 13. The producer 11 consists of a tight metal shell 20 having an opening in the top thereof which may be closed by a cover 21 provided with a water seal 22. The interior of the shell is lined with fire brick 23 which surrounds a central opening 24 in which a checker work of fire brick 25 is formed. This checker work consists of bricks laid in courses with spaces 26 therebetween, these courses being laid alternately at right angles with each other so as to provide vertical channels between the bricks. A pipe 30 delivers natural gas to the top of the chamber 24. Surrounding the shell 11 near the bottom portion thereof is a pipe 31 which is supplied with ammonia through a pipe 32 controlled by a valve 33. The pipe 31 communicates through a plurality of nozzles 34 with the interior of the chamber 24 so that ammonia may be injected into this chamber at a number of different points. The lower end of the chamber 24 is closed by a mass of fire brick 36 having a channel 37 therein which communicates with a gas opening 38 and a flue opening 39. Tightly secured in the gas opening 38 is a metal member 40 into which a gas nozzle 41 projects, this nozzle being supplied with gas through a pipe 42 controlled by a valve 43. The air is supplied to the interior of the metal chamber 40 through a pipe 44 controlled by a valve 45 by a centrifugal blower 46. The flue opening 39 connects through a pipe 49 with the cooler 12 which consists of a metal box 50 having an intermediate diaphram 51. The pipe 49 passes through the top of the box 50 and through the diaphram 51. The interior of the box 50 is filled with liquid, preferably sulfuric acid to the level L—L which is slightly above the diaphragm 51. The box 50 is preferably lead lined to prevent being acted upon by the sulfuric acid. The diaphragm 51 has a hole 53 near one end thereof which is below an outlet pipe 54 which communicates with the bottom of the absorption tower 13.

This absorption tower consists of a shell 60 communicating at its top with a stack 61 and divided by partitions 62 and 63 into three chambers. In each of these chambers a checker work of wood or other material is built up, this checker work being kept constantly wet by a spray nozzle 65 which is fed by liquid by a centrifugal pump 66, this liquid being taken through a pipe 69 from the space below the checker work. A constant supply of fresh liquid is delivered through a pipe 70 into the upper spray nozzle 71, this liquid running downwardly through the three chambers and being withdrawn in the form of a hydrocyanic acid solution through a pipe 72. The object of the three chambers is to increase the efficiency of the absorption tower.

The method of operation is as follows:

The cover 12 being removed by any suitable means, not shown, gas is supplied through the pipe 42 to the interior of the member 40 which is supplied with air through the pipe 44, the gas being ignited so that it burns inside the chamber 24 and in and around the checker work 25. The gas fire is maintained until such time that the whole interior of the chamber 24 is highly heated. The valves 43 and 45 are then closed and has the effect of closing off any exit through the opening 38 and the cover 21 is replaced being made tight by the water seal 22. Hydrocarbon gas is then supplied through the pipe 30, this hydrocarbon being preferably natural gas. The hydrocarbon passing downwardly through the checker work is highly heated. I have found that in practice it is advisable to raise it to a temperature of at least 500° C. before it reaches the zone of the nozzles 34. Ammonia is then injected through these nozzles, this ammonia coming in contact with the highly heated hydrocarbon and forming a mixture therewith in which the chemical reaction takes place, hydrocyanic acid being formed. Under these conditions the ammonia and hydrocarbon are broken down, hydrocyanic acid being formed. The ammonia nozzles are so located and the speed of the gases through the apparatus is so regulated that the mixture remains in the heated zone for a period just sufficient for the completion of the reaction. By preheating the hydrocarbon gases the reaction between the ammonia and the hydrocarbon when they are associated is very rapid and the efficiency is very high. The highly heated gases are forced through the pipe 49 below the diaphragm of the cooler 54 passing along as bubbles in contact with the liquid therein. This liquid is supplied through a pipe 80, liquid and sludge being withdrawn through pipe 90. In the cooler the gases are very greatly reduced in temperature and any excess of ammonia is caught and saved by the sulfuric acid solution. The cooled gases are passed into the bottom of the absorption tower passing upwardly through the various checker works 64 and through the openings in the diaphragm 62 and 63. These diaphragms have collars 67 formed therein so that a certain amount of liquid tends to collect thereon, being drawn upon by the pump 60 and being maintained by the constant supply of liquid delivered through the pipe 70. Hydrocyanic acid is absorbed in the liquid trickling down over the checker works being finally withdrawn as a solution through the pipes 72.

In practice I find it economical to heat the hydrocarbon to a temperature about 500° C. in which event it is desirable that the temperature applied to the mixture should be somewhere between 950° C. and 1450° C.

I claim as my invention:

1. A process of producing hydrocyanic acid which comprises heating a hydrocarbon and injecting ammonia into said heated hydrocarbon.

2. A process of producing hydrocyanic acid which comprises heating a hydrocarbon and injecting ammonia into said heated hydrocarbon, said mixture of ammonia and hydrocarbon being thereafter further heated to assist the reaction.

3. A process of producing hydrocyanic acid which comprises heating a hydrocarbon to a temperature above 500° centigrade and injecting ammonia into said heated hydrocarbon.

4. A process of producing hydrocyanic acid which comprises heating a hydrocarbon to a temperature above 500° centigrade and injecting ammonia into said heated hydrocarbon, said mixture of ammonia and hydrocarbon being thereafter further heated to assist the reaction.

5. A process of producing hydrocyanic acid which comprises heating a hydrocarbon and injecting ammonia into said heated hydrocarbon, said mixture of ammonia and hydrocarbon being thereafter heated to a temperature above 1000° centigrade.

6. A process of producing hydrocyanic acid which comprises heating a hydrocarbon, to a temperature above 500° centigrade and injecting ammonia into said heated hydrocarbon, said mixture of ammonia and hydrocarbon being thereafter heated to a temperature above 1000° centigrade.

In testimony whereof, I have hereunto set my hand at Los Angeles, California, this 25th day of June, 1920.

ROBERT WADE POINDEXTER.